UNITED STATES PATENT OFFICE.

GEORGE W. SWAN, OF SAN FRANCISCO, CALIFORNIA, ASSIGNOR OF ONE-FOURTH TO J. HUNTINGTON LYMAN, OF SAME PLACE.

PAINT.

SPECIFICATION forming part of Letters Patent No. 369,301, dated August 30, 1887.

Application filed June 29, 1886. Serial No. 206,661. (No specimens.)

*To all whom it may concern:*

Be it known that I, GEORGE W. SWAN, of the city and county of San Francisco, State of California, have invented an Improvement in Paint; and I hereby declare the following to be a full, clear, and exact description of the same.

My invention relates to an improvement in paint compound and in a method for preparing the same, which will be more fully explained by reference to the following specification.

In making my paint I employ a solid residuum known as "factitious" or "artificial" maltha, produced in the manufacture of petroleum-oils, and having little or no paraffine in it, and which has hitherto been believed to be insoluble, except in certain volatile products, such as bisulphide of carbon. The objection to the use of this material is the disagreeable odor, and, second, the very volatile character which makes it impossible to keep the paint thin enough for proper application and spreading.

I have discovered that by boiling the factitious or artificial maltha with benzin a change takes place in which such a union is formed that the said maltha will remain in perfect solution in the benzin for a long time without settling to the bottom or without there being sufficient evaporation to cause it to perceptibly thicken beyond the proportions in which it was originally made.

Previous to my invention it has not been possible to dissolve the factitious or artificial maltha in benzin alone, although benzin has been employed, after the solution has been made in the bisulphide of carbon, as a vehicle to prevent the rapid drying up of the compound.

To carry out my invention I take in ten parts either four of the maltha and six of the benzin, or from that to seven parts of said maltha and three of benzin. In some cases, for certain purposes, I may add one or two parts of oil and from one to four parts of turpentine, in which case I would use only one part of benzin and four parts of factitious or artificial maltha. This forms a very good compound for coating metals. When it is desired to make various colors, I would add any desired pigment, such as Venetian red, in which case I would use five parts of factitious or artificial maltha, three parts Venetian red, two parts of oil, and two parts of benzin.

In order to prepare this compound I first melt the factitious or artificial maltha until it is in a comparatively fluid condition, then add the pigment, oil, turpentine, and benzin, or such proportion as may be used for either compound desired, and boil the whole from ten to thirty minutes. The boiling may take place in any desired apparatus; but on account of the inflammable nature of the ingredients I prefer to use an apparatus which I have perfected for the purpose. The act of boiling the ingredients together appears to produce some change by which the maltha is dissolved in the benzin, and will thereafter always remain in suspension and perfectly mixed, whereas, if any attempt be made to dissolve the factitious or artificial maltha in the benzin cold, it will simply make an intimate mixture if pulverized fine enough, but will settle to the bottom in a short time, leaving the benzin at the top. By my process I make a perfectly limpid and flowing compound which may be left standing open without any appreciable change, and can be applied so as to form a perfect coating to any desired surface.

This material is valuable for waterproofing cloth, leather, paper, or protecting metal or wood, and for painting both inside and outside surfaces, the proportion of the ingredients described above depending upon the class of work to which it is to be applied.

When it is desired to employ this paint upon surfaces like furnace-fronts or furnace-doors, which are to be subjected to great heat, I mix with it a proportion of graphite, asbestus, or similar incombustible substance. In this case I would use about three parts of graphite or asbestus, three parts of the factitious or artificial maltha, one part of oil, and three parts of benzin.

Other materials necessary to the composition of paints for various purposes may be added to my composition before described; but such materials are not claimed in this application.

Having thus described my invention, what I claim as new, and desire to secure by Letters Patent, is—

1. As a new composition of matter, the solid residuum which remains after the distillation of petroleum after it has been boiled or dissolved in benzin, substantially as described.

2. The process herein described, which consists in boiling and dissolving in benzin the hard solid residuum which remains after the distillation of petroleum or similar oils from their natural sources.

In witness whereof I have hereunto set my hand.

GEORGE W. SWAN.

Witnesses:
S. H. NOURSE,
H. C. LEE.